United States Patent
Ichinokawa

(10) Patent No.: US 9,489,849 B2
(45) Date of Patent: Nov. 8, 2016

(54) SYSTEM AND METHOD FOR MONITORING ROAD CONDITIONS USING BLIND SPOT INFORMATION

(71) Applicant: HONDA MOTOR CO., LTD., Tokyo (JP)

(72) Inventor: Jumpei Ichinokawa, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/219,892

(22) Filed: Mar. 19, 2014

(65) Prior Publication Data

US 2015/0269843 A1 Sep. 24, 2015

(51) Int. Cl.
| | |
|---|---|
| *B60Q 1/00* | (2006.01) |
| *G08G 1/16* | (2006.01) |
| *G08G 1/01* | (2006.01) |
| *G01C 21/34* | (2006.01) |
| *G01S 19/13* | (2010.01) |
| *G01S 19/14* | (2010.01) |
| *G01S 5/00* | (2006.01) |
| *G08G 1/052* | (2006.01) |
| *G08G 1/0967* | (2006.01) |
| *G08G 1/0968* | (2006.01) |

(52) U.S. Cl.
CPC ............... *G08G 1/167* (2013.01); *G01C 21/34* (2013.01); *G01S 5/0072* (2013.01); *G01S 19/13* (2013.01); *G01S 19/14* (2013.01); *G08G 1/0112* (2013.01); *G08G 1/0133* (2013.01); *G08G 1/0141* (2013.01); *G08G 1/052* (2013.01); *G08G 1/096716* (2013.01); *G08G 1/096758* (2013.01); *G08G 1/096775* (2013.01); *G08G 1/096827* (2013.01); *G08G 1/096844* (2013.01); *G08G 1/166* (2013.01)

(58) Field of Classification Search
CPC ..................... G01S 13/931; G01S 2013/9332; G01S 13/9332; G01S 19/13; G01S 19/14; G01S 5/0072; H04W 4/046; G08G 1/16; G08G 1/166; G08G 1/167; G08G 1/01; G08G 1/0125; G08G 1/0133; G08G 1/0112; G08G 1/0141; G08G 1/052; G08G 1/096716; G08G 1/096758; G08G 1/096775; G08G 1/096827; G08G 1/096844; G01C 21/34
USPC ................. 340/435, 905; 701/117–119, 301; 348/148, 149
See application file for complete search history.

(56) References Cited

U.S. PATENT DOCUMENTS

| | | | |
|---|---|---|---|
| 5,257,023 A * | 10/1993 | Furuya | .......................... 340/905 |
| 6,480,783 B1 | 11/2002 | Myr | |
| 7,571,029 B2 | 8/2009 | Dai et al. | |
| 7,593,809 B2 | 9/2009 | Rosen et al. | |

(Continued)

OTHER PUBLICATIONS

Adrian Broadhurst, Simon Baker, and Takeo Kanade A Prediction and Planning Framework for Road Safety and Analysis, Obstacle Avoidance and Driver Information the Robotics Institute Carnegie Mellon University Feb. 2004.

(Continued)

*Primary Examiner* — Thomas Mullen
(74) *Attorney, Agent, or Firm* — Arent Fox LLP

(57) ABSTRACT

A system for monitoring roadway conditions for a vehicle has a control unit processing data captured by a plurality of existing blind spot information sensors coupled to the vehicle to detect objects around the vehicle, the data processed indicating congestion on the roadway.

6 Claims, 2 Drawing Sheets

(56) References Cited

U.S. PATENT DOCUMENTS

| | | | |
|---|---|---|---|
| 7,612,658 | B2 | 11/2009 | Stopczynski |
| 7,796,081 | B2 | 9/2010 | Breed |
| 7,804,423 | B2* | 9/2010 | Mudalige et al. ............ 340/905 |
| 8,290,695 | B2 | 10/2012 | Hiestermann et al. |
| 8,423,255 | B2 | 4/2013 | Padmanabhan et al. |
| 8,467,956 | B2 | 6/2013 | Lee et al. |
| 2002/0005778 | A1* | 1/2002 | Breed et al. .................. 340/435 |
| 2005/0137756 | A1* | 6/2005 | Takahashi ..................... 340/439 |
| 2011/0307188 | A1* | 12/2011 | Peng et al. ......... G06Q 10/0639 702/33 |
| 2013/0018545 | A1* | 1/2013 | Prakah-Asante et al. .... 701/118 |
| 2013/0282271 | A1 | 10/2013 | Rubin et al. |
| 2013/0321179 | A1 | 12/2013 | Santucci et al. |
| 2014/0280177 | A1* | 9/2014 | Ishii et al. ........ G06F 17/30598 707/740 |
| 2014/0358413 | A1* | 12/2014 | Trombley et al. ............ 701/118 |

OTHER PUBLICATIONS

Adreas Eidehall Tracking and Threat Assessment for Automotive Collision Avoidance Department of Electrical Engineering, Linkoping studies in science and technology. Dissertations, No. 1066, 2007 Linkopings Universitet, SE-581 83 Linkoping Swedem.

Besat Zardosht A Decision Making Module for Cooperative Collision Warning System Using Vehicular Ad-Hoc Network 16th International IEEE Annual Conference on Intelligent Transportation Systems Cooperative Methods and Systems II.

Takatori, Yusuke a Study on a Crossing Collision Prevention System Using IVC and In-Vehicle Side Obstacle Detection Sensors 16th International IEEE Annual Conference on Intelligent Transportation Systems IEICE Tech. Rep.. vol. 113, No. 163, ITS2013-6, pp. 1-6, Jul. 2013 Advanced Vehicle Safety Systems IV.

* cited by examiner

SYSTEM AND METHOD FOR MONITORING ROAD CONDITIONS USING BLIND SPOT INFORMATION

TECHNICAL FIELD

The present application generally relates to a system for monitoring road conditions, and, more particularly, to a system and method for monitoring traffic conditions using blind spot monitoring data recorded by vehicles.

BACKGROUND

Presently, there may be many different ways for individuals to monitor and obtain traffic conditions. For example, individuals may obtain traffic conditions through television and radio reports. These reports may be generated through human observation of traffic conditions such as traffic reporters flying in helicopters, observation of traffic cameras, or through drivers reporting certain traffic issues via cellular telephones or other communication devices to one or more traffic monitoring websites and or individuals. While human-supplied observations may provide some value, such information is typically limited to a few selected areas such as high traffic areas. Further, the data provided generally lack details other than whether a certain area is congested or not.

Another way individuals may obtain traffic conditions is through the use of traffic sensors. Some municipalities may install traffic sensors on roads as a way to monitor and record traffic conditions. The recorded traffic conditions may then be relayed to drivers to inform the drivers of certain road conditions. Unfortunately, many roads may not have road sensors as road sensor system may be costly to install and set-up. Further, even if roads do have traffic sensors installed, the traffic sensors may not provide accurate data. Accuracy of the traffic signals may be affected due to broken traffic sensors, transmission issues of data from one or more traffic sensors, and the like. Further, traffic sensors may not be able to detect current speed differences between different lanes on the road.

Therefore, it would be desirable to provide a system and method that overcome the above problems.

SUMMARY

This summary is provided to introduce a selection of concepts in a simplified form that are further described below in the DESCRIPTION OF THE INVENTION. This summary is not intended to identify key features of the claimed subject matter, nor is it intended to be used as an aid in determining the scope of the claimed subject matter.

In accordance with one aspect of the present application, a system for monitoring conditions on a roadway for a vehicle that has a control unit processing data captured by a plurality of existing blind spot information sensors coupled to the vehicle detecting objects around the vehicle is provided. The data processed indicates congestion on the roadway.

In accordance with another aspect of the present application, a system for monitoring conditions on a roadway through blind spot information of a vehicle that has a control unit receiving the blind spot information from a plurality of existing sensors coupled to the vehicle is provided. The control unit indicates congestion on the roadway and determines speed differences between lanes on the roadway based on a number of objects detected by the plurality of existing sensors per a predetermined distance and a length of time each of the plurality of existing sensors monitors a detected object.

In accordance with yet another aspect of the present application, a method for monitoring roadway conditions including: monitoring data from a blind spot information system of a vehicle; indicating congestion on a roadway based on a number of objects detected by the blind spot information system per a predetermined distance; and determining speed differences between lanes on the roadway based on a length of time the blind spot information system monitors a detected object.

BRIEF DESCRIPTION OF DRAWINGS

Embodiments of the disclosure will become more fully understood from the detailed description and the accompanying drawings, wherein.

DESCRIPTION OF THE INVENTION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Figure 1:
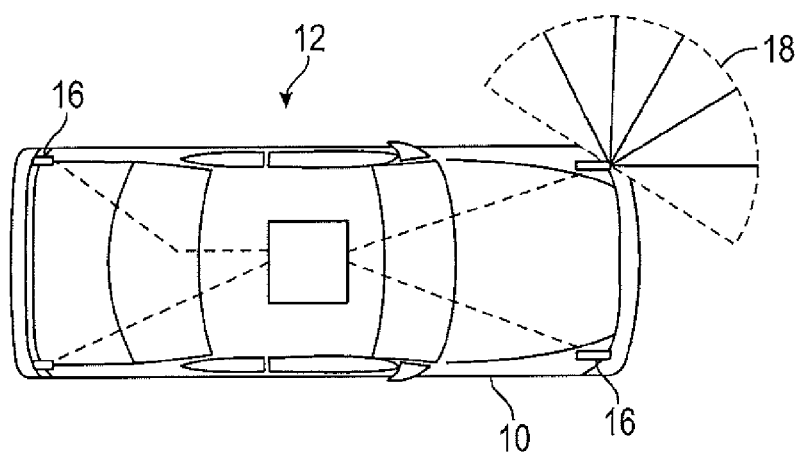
FIG. 1 is an elevated perspective view of a vehicle implementing an exemplary system for monitoring traffic conditions using blind spot information in accordance with one aspect of the present application.

Referring to FIG. 1, an exemplary vehicle 10 is shown. The vehicle 10 may be equipped with a system 12 that may be used for monitoring traffic conditions. The system 12 may be configured to use blind spot information recorded by the vehicle 10 as well as other vehicles on the roadway using the system 12. The system 12 may be configured to use blind spot information to calculate roadway congestion as well as speed differences between lanes on the roadway.

Figure 2:
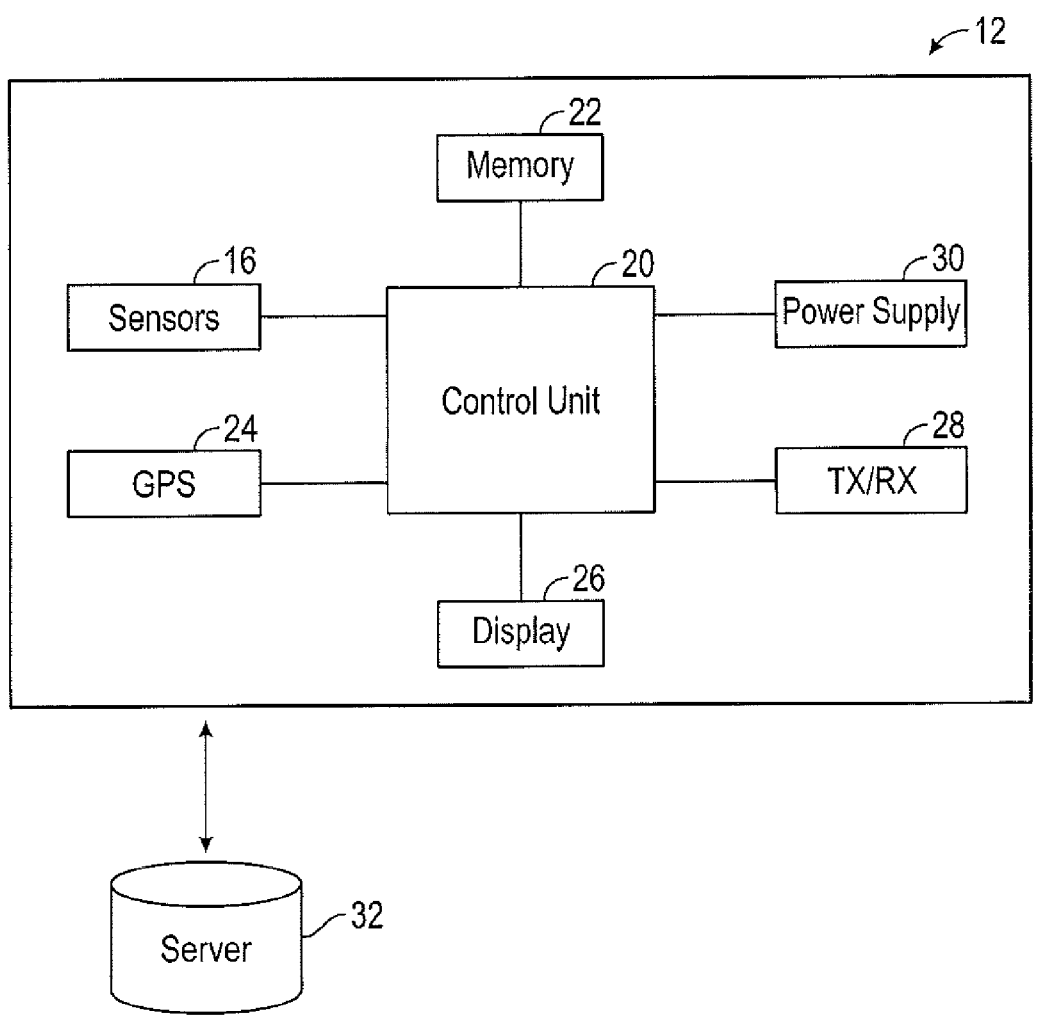
FIG. 2 is a simplified functional block diagram of the exemplary system depicted in FIG. 1 in accordance with one aspect of the present application.

Referring now to FIGS. 1 and 2, the system 12 may have a plurality of sensors 16. The sensors 16 may be positioned around a perimeter of the vehicle 10. In accordance with one embodiment, the sensors 16 may be positioned around the vehicle 10 to monitor potential blind spot areas. The sensors 16 may be positioned on opposing sides of the vehicle 10 to monitor potential blind spot areas. While FIG. 1 may show sensors 16 located on front and rear areas of the vehicle 10 this is only shown as an example. The sensors 16 may be mounted to the rear area of the vehicle 10, the front area of the vehicle 10 or both the front and rear areas of the vehicle 10. While FIG. 1 may show sensors 16 located on a left and right side areas of the vehicle 10 this is only shown as an example and should not be seen in a limiting manner. The sensors 16 may be configured to be mounted within the body of the vehicle 10. The sensors 16 may be used to capture data of objects located around the vehicle 10. As shown in FIG. 1, the sensors 16 may be used to detect objects located in detection zone 18 associated with each sensor 16. In accordance with one embodiment, the detection zone 18 may be potential blind spot areas of the vehicle 10. The sensors 16 may be cameras, image sensing devices, or radars. A combination of these sensors 16 may be used. The above mentioned types of sensors 16 are given as an example and should not be seen in a limiting manner.

The sensors 16 may be coupled to a control unit 20 having associated memory 22. The control unit 20 may be implemented in hardware, software or a combination thereof. The control unit 20 may store a computer program or other programming instructions associated with the memory 22 to control the operation of the system 12. The data structures and code within the software in which the present disclosure may be implemented, may typically be stored on non-transitory computer-readable storage. The storage may be any device or medium that may store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. The control unit 20 may be various computing elements, such as integrated circuits, microcontrollers, microprocessors, programmable logic devices, etc, alone or in combination to perform the operations described herein.

The control unit 20 may receive the data captured by the sensors 16. The control unit 20 may process the data in order to determine roadway congestion as well as to determine speed differentials of lanes on the roadway adjacent to a lane in which the vehicle 10 is currently traveling as will be discussed below. Alternatively, the data may be sent to a server 32 for processing as discussed below.

The memory 22 may be coupled to the control unit 20 as well as other components of the system 12. The memory 22 may be used to store various data utilized by the control unit 20 and or other components of the system 12. The memory 22 may include removable and non-removable memory elements such as RAM, ROM, flash, magnetic, optical, and/or other conventional memory elements. The above listing is given as an example and should not be seen in a limiting manner.

The memory 22 may be used to store programming data for instructing the processor 14 or other components of the navigation system 12 to perform certain steps as will be described below. The memory 22 may also store various data processed by the control unit 20. The above listing is given as an example and should not be seen in a limiting manner. The memory 22 may store other data without departing from the sprit and scope.

In accordance with one embodiment, the system 12 may have a Global Positioning Satellite (GPS) unit 24. The GPS unit 24 may be used to determine a present location of the vehicle 10. The GPS unit 24 may be able to provide speed and direction of travel data of the vehicle 10. The GPS unit 24 may be configured to calculate and recalculate a route from a present location of the vehicle 10 to a desired destination based on road conditions as determined by the system 12.

The control unit 18 may be coupled to a display 26. The display 26 may be used to provide a visual indication of objects detected by the sensors 16. The display 26 may further be used to provide visual indication of the speed differential between lanes on the roadway. The display 26 may show route calculations as determined by the GPS unit 24. The display 26 may be a Liquid Crystal Display (LCD), Light Emitting Diode (LED) display, and the like. The display 26 may also be a Heads Up Display (HUD) system. The above listing is given as an example and should not be seen in a limiting manner.

The control unit 18 may be coupled to a transmitter/receiver 28. The transmitter/receiver 28 may be used to transmit and receive data to and from the vehicle 10. Thus, the transmitter/receiver 28 may be used to transmit and receive data related to the roadway congestion and speed differentials between lanes on the roadway. The transmitter/receiver 28 may be used to send and receive data to and from a server 32, wherein the server 32 may form part of the system 12.

The system 12 may have a power source 30. The power source 30 may be provided to supply power to the various components of the system 12. Thus, the power source 30 may be used to directly or indirectly power the control unit 20, memory 22, GPS unit 24, display 26 and transmitter/receiver 28. The power source 30 may be batteries, an adapter for running off of power supplied by the vehicle 10 or the like. The above is given as an example and should not be seen in a limiting manner.

As stated above, the system 12 may have a server 32. The server 32 may be used to accumulate data monitored and or calculated from different vehicles 10 having the system 12. Based on the data accumulated, the server 32 may transmit data related to roadway congestion, speed and or danger to one or more vehicles 10 coupled to the server 32.

Figure 3:
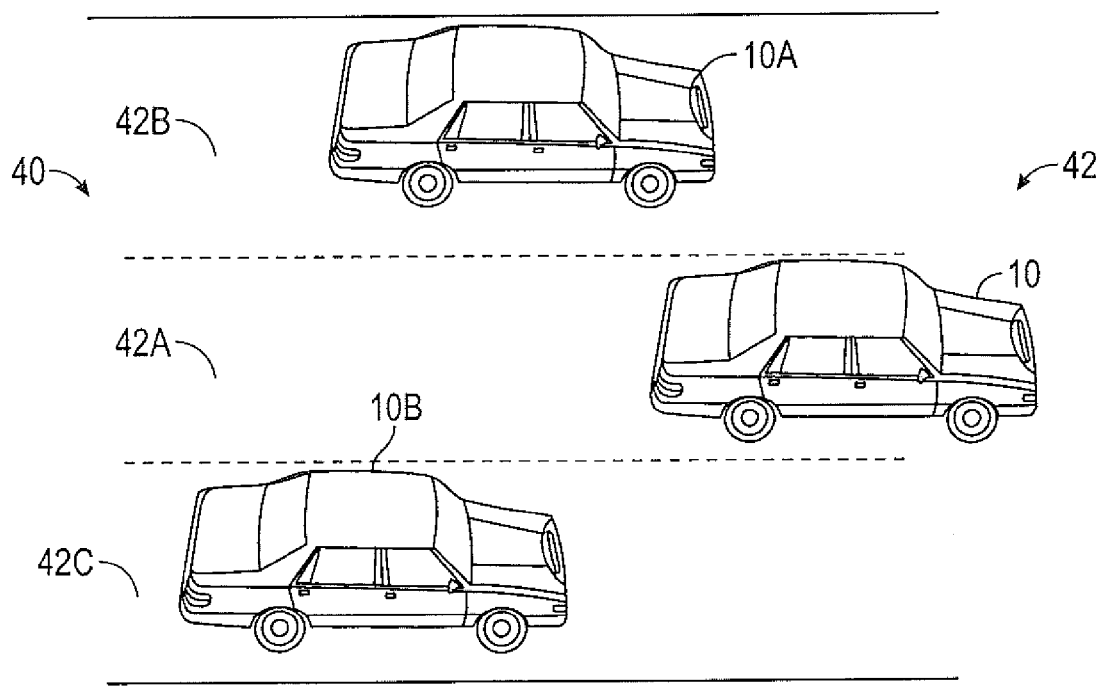
FIG. 3 shows a vehicle employing the exemplary system depicted in FIG. 1 on a roadway in accordance with one aspect of the present application.

As shown in FIG. 3, a vehicle 10 may be driving on a roadway 40 having a plurality of lanes 42. The vehicle 10 may be driving in lane 42A. Lanes 42B and 42C may be adjacent to lane 42A. While FIG. 3 shows three (3) lanes 42A, 42B, and 42C, this is shown as an example and should not be seen in a limiting manner. The roadway 40 may have any number of lanes without departing from the spirit and scope of the system 12 described in the present application.

A plurality of other vehicles 10A-10B may be on the roadway 40 with vehicle 10. While FIG. 3 shows two (2) other vehicles 10A-10B, this is shown as an example and should not be seen in a limiting manner. The system 12 in vehicle 10 may be configured to use blind spot information. The system 12 may monitor a number of times the sensors 16 detect an object. By monitoring the number of times the sensors 16 detect an object, the control unit 20 may determine congestion on the roadway 40 as well as speed differences between the plurality of lanes 42.

Congestion on the roadway 40 may be determined as follows. If one or more of the sensors 16 detects a high number of objects per a predetermined distance, then the control unit 20 may determine that the roadway 40 may be difficult to change lanes on so the roadway 40 may be difficult for drivers to travel on. The higher the number of detections by the sensors 16 per the predetermined distance, the more congested the roadway 40 may be. The predetermined distance may be any distance. In accordance with one embodiment, the predetermined distance may be one mile. However, this is only given as an example and should not be seen in a limiting manner.

The control unit 20 may be configured to have a plurality of different threshold values. Each threshold level corresponds to a predetermined number of detections by one of the sensors 16. Each threshold value may correspond to a different congestion levels.

If the roadway 40 is congested, the system 12 may calculate and or recalculate a route from the present location to the desired location avoiding the congested roadways using the GPS unit 24. Similarly, if the sensors 16 on one side of the vehicle 10, for example the right side, detect a low number of objects and the sensors 16 on the other side of the vehicle 10, for example the left side, detect a high number of objects, based on a current speed of the vehicle 10, the control unit 20 may determine that the lane located on the right side of the vehicle 10 may be a less congested route to take.

The system 12 may be configured such that if sensors 16 located on the left side of the vehicle 10 do not detect any objects while sensors 16 located on the right side of the vehicle detect numerous objects, the system 12 may determine that the vehicle 10 is traveling on the far left hand lane of the roadway 40 in relation to the driver. Similarly, if sensors 16 located on the right side of the vehicle 10 do not detect any objects while sensors 16 located on the left side of the vehicle detect numerous objects, the system 12 may determine that the vehicle 10 is traveling on the first right hand lane of the roadway 40 in relation to the driver. The system 12 may be configured such that if sensors 16 located on the left side of the vehicle 10 continuously detects objects, the vehicle 10 may be traveling on the far left hand lane of the roadway 40 in relation to the driver wherein a median and/or wall may be located on the left side of the vehicle 10. Typically, and in most cities, this may indicate that the vehicle 10 is driving in a carpool lane.

Since sensors 16 may be located on both a left side and a right side of the vehicle 10, the system 12 may be able to detect vehicles located in a lane to the left of the vehicle 10 and vehicles located in a lane to the right of the vehicle 10. Thus, the system 12 may be able to determine the speed difference between a present lane the vehicle 10 is driving and the lane to the left of the vehicle 10 as well as the lane to the right of the vehicle 10 as will be discussed below.

Figure 4A:
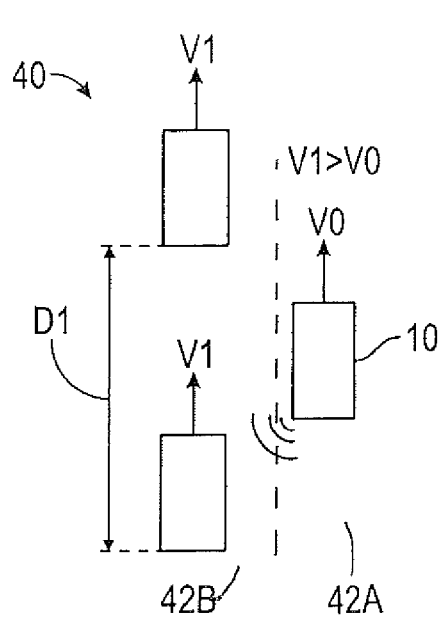
FIG. 4A is a simplified diagram showing one example of how blind spot information may be used in determining speed differential between different lanes on a roadway in accordance with one aspect of the present application.

Referring now to FIG. 4A, determining the speed difference between lanes on the roadway 10 will be discussed. As seen in FIG. 4A, the vehicle 10 may be driving in lane 42A of the roadway 40. Other vehicles may be traveling in adjacent lane 42B. In this embodiment, the vehicles traveling in adjacent lane 42B may be traveling at a faster rate than the vehicle 10. The length of time the sensors 16 detects an object may be represented by the equation:

$$Bn = 1/T1 = 1/(D1/(V1-V0)) = (V1-V0)/D1$$

Bn is a speed difference between adjacent lanes
T1 is the interval of time the sensors censor 16 detects the object
V0 is the speed of the vehicle 10
V1 is the speed of the vehicle detected by the sensors 16
D1 is distance between vehicles detected by the sensors 16 in the adjacent lane 42B As the speed difference between the vehicle detected by the sensor 16 and vehicle 10 increases, Bn also increases. Similarly, if the distance D1 traveled by the vehicle in lane 42B becomes smaller, Bn also increases. Thus, Bn can indicate the level of the speed difference between lanes 42A and 42B (V1−V0), and the open space between vehicles in D1 of the adjacent lane 42B. Both large speed differences distance and small open space of next lane may be disliked by driver of vehicle 10, because it is not easy to change into the lane 42B. Accordingly, Bn may imply the road danger level.

Figure 4B:
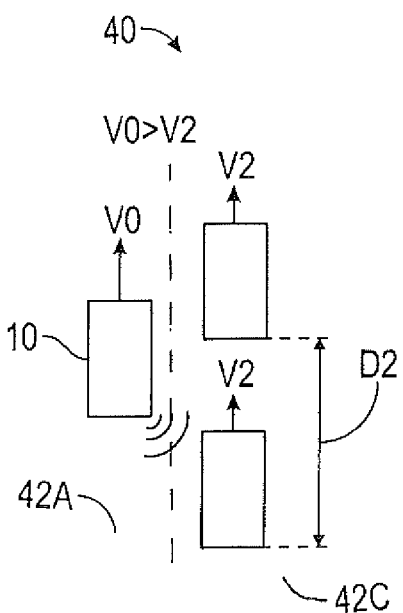
FIG. 4B is a simplified diagram showing another example of how blind information may be used in determining speed differential between different lanes on a roadway in accordance with one aspect of the present application.

Referring now to FIG. 4B, another example is shown for determining the speed difference between lanes on the roadway 10. As may be seen in FIG. 4B, the vehicle 10 may be driving in a lane 42A of the roadway 40. Other vehicles may be travel in an adjacent lane 42C. In this embodiment, the vehicles traveling in the adjacent lane 42C may be traveling at a slower rate than the vehicle 10. The length of time the sensors 16 detects an object may be represented by the equation:

$$Bn = 1/T1 = 1/(D2/(V0-V2)) = (V0-V2)/D2$$

Bn is the speed difference between adjacent lanes
T1 is the interval of time the sensors 16 detects the object
V0 is the speed of the vehicle 10
V2 is the speed of the vehicle detected by the sensors 16
D2 is distance between vehicles detected by the sensors 16 in the adjacent lane 42C.

As the speed difference between the vehicle detected by the sensor 16 and vehicle 10 increases, Bn also increases. Similarly, if the distance D1 traveled by the vehicle in lane 42C becomes smaller, Bn also increases. Thus, Bn can indicate the level of the speed difference between lanes 42A and 42C (V0−V2), and the open space D2 of the adjacent lane 42C. Both large speed differences and small open space of next lane may be disliked by driver of vehicle 10, because it is not easy to change into the lane 42C. Accordingly, Bn may imply the road danger level.

The system 10 may be configured to calculate the values of V1 and V2. Based on a current speed of the vehicle 10 and the time T1 the sensor 16 detects the object, an approximation of V1 and/or V2 may be calculated. If the vehicle 10 has sensors 16 located in a front and rear section of the vehicle 10, then using a time differential of when the sensor 16 in the rear of the vehicle 10 detects the object and when the sensor 16 in the front of the vehicle 10 detects the object, an approximation of V1 and V2 may be calculated based on the speed of vehicle 10 as well as the distance between the sensors 16 located in the front and rear section of the vehicle 10.

The system 10 may be used to determine congestion on the roadway 40 as well as the speed difference between a present lane the vehicle 10 is driving and the lane left of the vehicle 10 as well as the lane right of the vehicle 10. The system 12 may allow this data to be loaded to the server 32 and transmitted to other vehicles 10 using the system 12. Based on data monitored by the vehicle 10 as well as data transmitted by the server 32, the system 10 may recommend a route to a desired destination that avoids potentially congested roadways 40. The system 12 may calculate and/or recalculate the route to avoid these congested roadways 40. The system 12 may recommend specific lanes on the roadway 40 to travel based on congestion levels monitored. For example, if the far right hand lane is more congested and moving slower, the system 12 may recommend that the vehicle 12 move over to another lane such as a center lane, or far left hand lane. Based on the speed calculation of the different lanes, the system 12 may recommend whether a carpool lane is less congested and a faster alternative. In certain areas where certain lanes may be toll lanes, the system 12 may recommend whether the toll lane is less congested and a faster alternative. While the above examples are given as to how the data monitored by the system 12 may be used, it is only given as examples and should not be seen in a limiting manner.

While embodiments of the disclosure have been described in terms of various specific embodiments, those skilled in the art will recognize that the embodiments of the disclosure may be practiced with modifications within the spirit and scope of the claims.

What is claimed is:

1. A system for monitoring conditions on a roadway for a vehicle comprising:
   a control unit monitoring a number of times that a plurality of existing blind spot information sensors coupled to the vehicle detect objects around the vehicle when the vehicle is moving, the number of times indicating traffic congestion on lanes of the roadway adjacent to and carrying traffic in a same direction as the vehicle.

2. The system of claim 1, wherein the control unit is a server located remotely from the vehicle, the server processing and storing the number of times the plurality of existing blind spot information sensors coupled to the vehicle detect objects around the vehicle when the vehicle is moving for transmittal to other vehicles.

3. The system of claim 1, wherein a Global Positioning System (GPS) unit coupled to the control unit recalculates a route for the vehicle to travel when the number of times the plurality of existing blind spot information sensors coupled to the vehicle detect objects around the vehicle when the vehicle is moving indicates traffic congestion on the roadway.

4. The system of claim 1, wherein the control unit has a plurality of threshold limits for the number of objects detected by the while the vehicle travels a predetermined distance, for indicating different traffic congestion levels on the roadway.

5. The system of claim 1, wherein
continuous detection of an object for a predetermined timeframe by one of the plurality of existing blind spot information sensors located on a left side of the vehicle provides a signal output by the control unit indicating that the vehicle is moving in a furthest left hand lane of the roadway carrying traffic in the same direction as the vehicle in relation to a driver of the vehicle.

6. The system of claim 1, wherein non-detection of an object for a predetermined timeframe by one of the plurality of existing blind spot information sensors located on a right side of the vehicle provides a signal output by the control unit indicating that the vehicle is moving in a furthest right hand lane of the roadway carrying traffic in the same direction as the vehicle in relation to a driver of the vehicle.

* * * * *